Inventor
Norris E. Wines.
By William C. Linton.
Attorney

Patented Oct. 15, 1935

2,017,642

UNITED STATES PATENT OFFICE 2,017,642

CHEESE-CUTTING MACHINE

Norris Earl Wines, East Cleveland, Ohio

Application September 29, 1934, Serial No. 746,259

6 Claims. (Cl. 31—5)

The present invention has reference to machines for cutting or slicing large blocks or hoops of cheese into smaller blocks or pieces in order that such smaller blocks may be more conveniently handled and sliced by the retailer in the quantity demanded by the customer. Imported Swiss cheese is among the popular brands of cheese sold to the trade in this country which are molded in relatively large blocks or hoops in a covering of cloth weighing about 200 pounds each and during the ageing process of the same a slimy coating is formed upon the outer surface thereof. Owing to the weight of these hoops of cheese and the slippery surface formed thereon, it is a fact that the handling and cutting of these hoops is rendered awkward and difficult. Heretofore, machines have been employed for cutting these large blocks of cheese having cutting elements such as wires and knife blades, but usually these machines are large and cumbersome and it is an object of the present invention to provide a machine of this character which will be comparatively light in weight and yet capable of supporting and cutting large blocks or hoops of cheese in the desired size or shape.

A further object of the present invention is to provide a supporting table for a cheese cutting machine having a relatively large cheese supporting surface in order that blocks of cheese of relatively large size and of heavy weight may be easily adjusted thereupon making it possible to cut the cheese in the quantity and size demanded.

A still further object of the present invention is to provide an adjustable cutting blade for machines of this character which may be easily and readily adjusted to various positions upon the supporting frame or table of the machine in a horizontal direction whereupon the cheese may be cut in the width desired and further adjustable in a vertical direction in order that blocks of cheese of various heights enclosed in the cloth covering may be sharply and effectively cut.

Further objects of the invention will be in part obvious and in part pointed out hereinafter.

In order that the invention and its mode of operation may be readily understood by persons skilled in the art, I have, in the accompanying illustrative drawing and in the following detailed description based thereupon, set out one possible embodiment of the invention.

Figure 1:
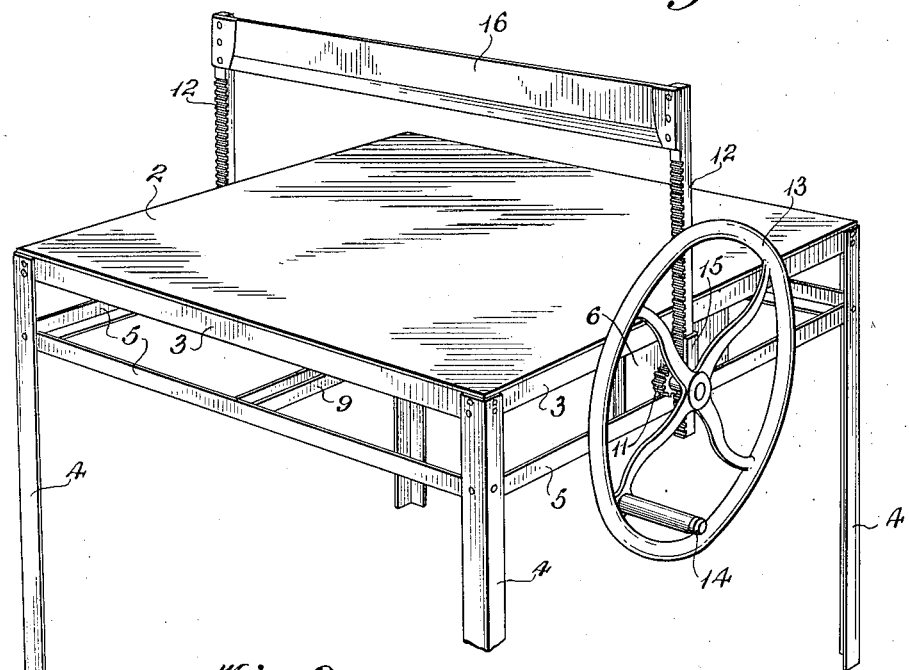
Figure 1 is a perspective view of the cheese cutting machine embodied in the present invention.
Figure 2:
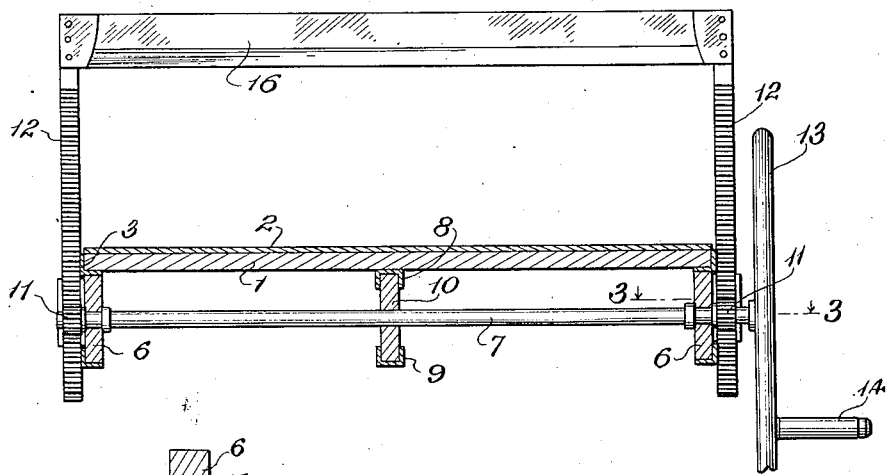
Figure 2 is a vertical transverse section through the same.
Figure 3:
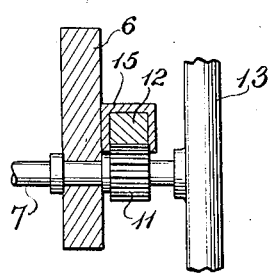
Figure 3 is a detail horizontal section taken on the line 3—3 of Figure 2 in the direction of the arrow points.

Referring now more particularly to the accompanying drawing wherein like and corresponding parts are designated by similar reference characters throughout the several views, I have herein shown a supporting table capable of supporting a large block or hoop of cheese and this table having adjustably mounted thereon a cutting element such as a knife blade as herein shown and said knife blade is caused to assume its various adjusted positions upon the table and cut the cheese thereupon through a manually operable gearing.

The cutting machine as shown upon the drawing comprises a table consisting of a top cut from a solid piece of redwood 1 having a coating 2 upon its upper face which is preferably made of a composition capable of adhering to the upper face of the redwood top 1 and yet capable of being removed therefrom should it become worn, whereby the table top may be replaced with a new cover. This top is seated within a support comprising the angle irons 3 which extend about the marginal edges of the table top and connected to the corners of these angle irons 3 are supporting legs 4. Whereas, I have herein illustrated the upper ends of the supporting legs as being connected to the angle irons 3 by means of bolts, these legs may be detachably connected in any other suitable manner or they may be so connected as to permit of the folding of the legs upon the top, whereby the complete machine may be folded in a compact manner, thereby requiring but a relatively small amount of space during shipment. Spaced from the table top and having their opposite ends connected to the legs 4 are the angle irons or bars 5 which not only provide a reinforcement for the table and its supporting legs but the angle irons at the opposite sides of the table provide a trackway for a purpose which will be now described. Slidably mounted within the trackways arranged at the opposite sides of the table formed by the angle irons 3 and 5, are blocks 6 and these blocks have journalled therein a drive shaft 7. Secured to the lower face of the table top is a channel bar 8 and connected to the angle bars 5 arranged at the opposite ends of the table is another channel bar 9. Slidably arranged within these channel bars 8 and 9 is a centrally located block 10 which provides an additional bearing support for the drive shaft 7.

Keyed to this shaft 7 are the pinions 11 which are adapted to mesh with the racks 12. In order that this shaft 7 may be manually rotated, a crank or wheel 13 is keyed to one end thereof and this wheel is provided with a handle 14. Secured to the outer face of each of the blocks 16 is a guide bracket 15 in each of which is slidably arranged a rack 12 and these guide brackets retain the racks in mesh with their respective pinions 11 so that upon rotation of the wheel 13 these racks will be caused to reciprocate in a vertical direction within their respective guide brackets. Secured to the upper ends of these racks 12 is a cutting blade having a lower double-bevelled cutting edge. From this arrangement it is obvious that the operator by grasping the handle 14 or the wheel 13, may cause the cutting blade 16 to move horizontally above the table top and by the rotation of this wheel 13 the cutting blade 16 may be raised and lowered above the table top.

A cheese cutting machine made in accordance with this invention will be light in weight due to its construction and yet will be sturdy enough as to hold and permit the cutting of cheese when packed in heavy and large blocks or hoops. In order to cut a large block of cheese, it is first placed upon a table top and can be arranged at any position thereupon according to the size and quantity of cheese to be sliced or cut therefrom. After the cheese is placed in proper position, the knife 16 may be adjusted at the desired place above the table top from where the cutting of the cheese is to take place and such large blocks or hoops of cheese may be cut in the desired size or shape. These large blocks or hoops of Swiss cheese are usually circular in contour and after one slice or portion of the block has been cut therefrom, the remaining portion of the cheese may be cut in sectors or what is commonly known among the trade as "pie cuts". By employing a cutting blade or knife 16 the cuts of cheese will look neater and there will be less waste than when substituting a wire for such knife blade. The manually operable gearing as herein shown will permit the necessary power required for causing the blade 16 to cut through such large blocks of cheese with its cloth covering in less time and with less effort than by employing an ordinary knife for cutting the cheese.

Manifestly, the construction herein shown is capable of considerable modification and such modifications as come within the scope of my claims, I consider within the spirit of my invention.

I claim:

1. In a cheese cutter comprising a table, a cutting blade, spaced blocks slidably mounted upon said table, means for connecting said cutter to said blocks whereby it will be supported above said table and means carried by said blocks for vertically moving said cutter to and from said table top.

2. A cheese cutting machine comprising in combination a supporting table, guideways arranged within said supporting table, a block adjustably mounted within each guideway, a shaft journalled within said blocks, rack bars operatively connected to said shaft, a cutting blade connected to said rack bars and a crank connected to said shaft.

3. A cheese cutting machine comprising a table having a relatively large cheese supporting surface, guideways formed with said table, blocks slidably mounted within said guideways, a shaft journalled within said blocks, a guide bracket secured to each block, a rack bar slidably mounted within each guide bracket, pinions carried by said shaft and adapted to mesh with said rack bars, a cutting blade carried by and secured to said rack bars and a crank connected to said shaft.

4. A cheese cutting machine comprising in combination a table top having a relatively large cheese supporting surface, an angle iron frame for receiving said table top, supporting legs connected to said frame, angle rods connected to said legs, blocks slidably mounted upon said angle rods, a shaft journalled within said blocks, a crank connected to said shaft, a cutting blade supported by said blocks and means for operatively connecting said cutting blade to said shaft.

5. A cheese cutting machine comprising in combination a table, said table consisting of a top made from a solid board, a composition coating applied to and extending over the entire upper surface of said board, an angle iron frame, said board being seated within said frame, supporting legs connected to said frame, guideways arranged between said supporting frame and legs therefor, blocks slidably mounted within said guideways, guide brackets secured to said blocks, rack bars slidably mounted within said guide brackets, a cutting blade carried by said rack bars, a shaft journalled within said blocks, pinions keyed to said shaft and adapted to mesh with said rack bars and a crank connected to said shaft.

6. A cheese cutting machine comprising in combination a table top having a relatively large cheese supporting surface, supporting legs for said table top, angle bars connecting said supporting legs, channel bars suspended below said table top, blocks slidably mounted within said angle and channel bars, a driven shaft journalled within said blocks, a cutting blade arranged above said table top and means for operatively connecting said cutting blade to said driven shaft.

NORRIS EARL WINES.